June 23, 1925.
W. SPARKS
BRACKET
Filed Sept. 19, 1922
1,543,454
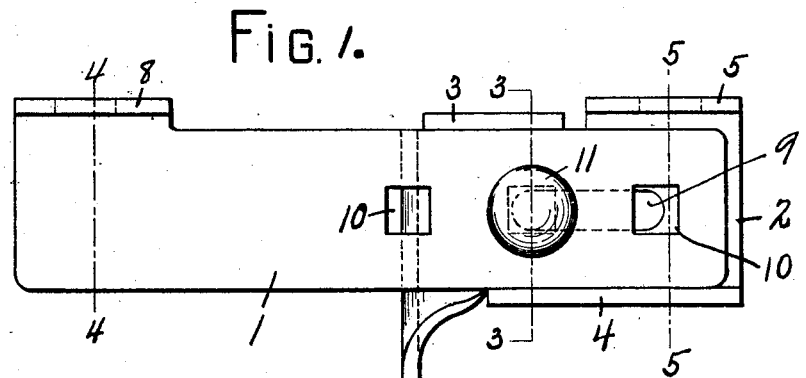
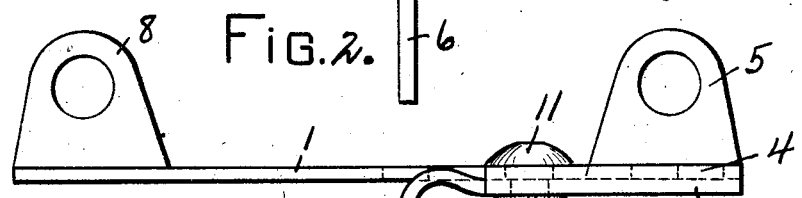
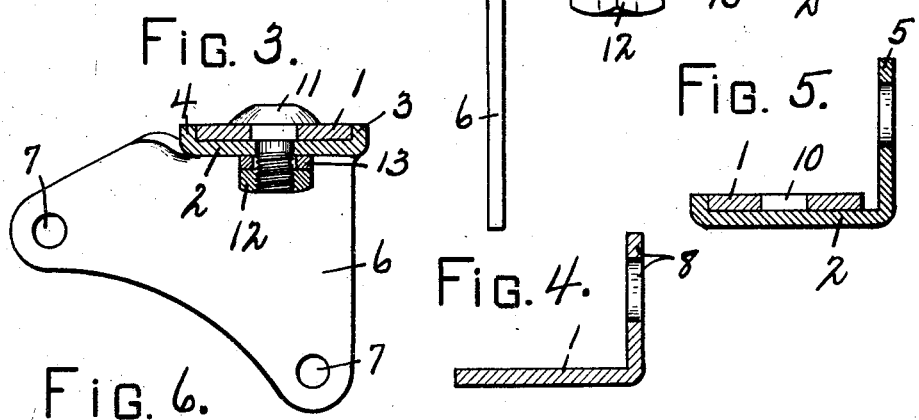
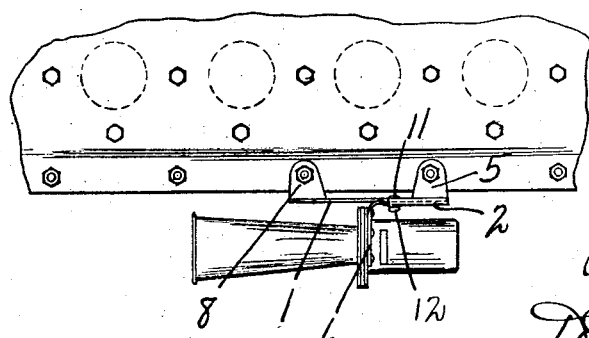

Patented June 23, 1925.

1,543,454

UNITED STATES PATENT OFFICE.

WILLIAM SPARKS, OF JACKSON, MICHIGAN, ASSIGNOR TO THE SPARKS-WITHINGTON COMPANY, OF CLEVELAND, OHIO, A CORPORATION OF OHIO.

BRACKET.

Application filed September 19, 1922. Serial No. 589,121.

*To all whom it may concern:*

Be it known that I, WILLIAM SPARKS, of Jackson, in the county of Jackson, in the State of Michigan, have invented new and useful Improvements in Brackets, of which the following, taken in connection with the accompanying drawings, is a full, clear, and exact description.

This invention relates to certain improvements in brackets, or supporting arms, designed particularly for supporting a motor driven horn upon the engine of an automobile, beneath the hood, although usable for supporting a horn in various other places.

Experience has demonstrated that practically every make of vehicle requires a bracket of special construction for supporting the horn used as regular equipment thereon, and the same is true of horns sold at retail for installation upon individual cars. It is therefore a great economy in time and money to provide a bracket that is adapted for supporting a horn upon practically any type or make of car, and the bracket of this invention is designed for that purpose and has the advantage of substantially accomplishing that effect, and is an improvement upon the structure shown in Letters Patent No. 1,400,007, issued December 13, 1921, to The Sparks-Withington Company.

The features of improvement of this bracket include the fact that it may be used and fits equally as well either side up, practically eliminates vibration of the horn, even when mounted in a depending position, lessens breakage by placing the strain of supporting the horn upon both cylinder head-bolt arms, and is a better appearing installation.

Other objects and advantages relate to the details of construction and form of the bracket and the parts thereof, all as will more fully appear from the following description taken in connection with the accompanying drawings in which—

Figure 1 is an elevation of the bracket.

Figure 2 is a top plan view of the same.

Figure 3 is a section on line 3—3, Figure 1.

Figure 4 is a section on line 4—4, Figure 1.

Figure 5 is a section on line 5—5, Figure 1.

Figure 6 is a top plan view of the bracket and the horn supported thereby, assembled on a motor vehicle.

The bracket, as illustrated, is formed of two relatively adjustable metal parts, —1— and —2—. The part —2— is the immediate support for the horn and comprises a comparatively short sheet metal strip formed in a channel by means of the flanges —3— and —4— upon opposite sides thereof, which flanges may be integral with the strip and bent upwardly therefrom and are preferably of a height substantially equal to the thickness of the strip —1—, and are spaced apart a distance practically just sufficient to receive the strip —1—, so as to maintain a predetermined alignment of the two parts —1— and —2—.

The part —2— is further provided with a bolt receiving flange —5—, preferably of considerably greater height than the flange —3— and formed upon the same side of the strip —2— as the flange —3— is formed, and spaced from the flange —4— a distance somewhat greater than the width of the strip —1—.

At its forward end the strip —3— is provided with a horn attaching flange —6—, which may have its outer edge somewhat arcuate in form so as to fit the diaphragm case of a motor driven horn, and is provided with bolt openings —7— which may be spaced and positioned to receive certain of the bolts ordinarily used in connection with motor driven horns for constituting a supporting and securing means.

This flange, as illustrated, is positioned in the completed structure at an intermediate point along the strip —1—, and such strip is adapted to extend forwardly from the flange —6— some distance and is provided at or near its front end with a bolt receiving flange —8—, similar to the flange —5— and in alignment therewith.

The part —2— may as shown be provided with an elongated slot —9—, and the strip —1— with a series of bolt receiving openings —10— any one of which openings can be brought into overlying relation with a portion of the slot —9—, so that a bolt may be projected through the slot and the parts —1— and —2— may be clamped together by means of a nut —12— mounted on the bolt —11—. Preferably a split washer —13— is interposed between the nut —12— and the strip —2—, and the openings —10— in the strip —1— are preferably of angular form, as for instance square, so as to receive a square portion of the bolt —11— to prevent relative rotation of the bolt and strip —1—.

It will be obvious that by this construction of parts, the two strips are held in their predetermined adjusted position in a rigid and substantial manner by the use of a single bolt, and that the utilization of a slot and a series of openings permits desired adjustment of the two strips —1— and —2—, constituting the structure, so that the bracket itself may be secured to a supporting part and the horn positioned in a manner to meet existing conditions.

Although I have shown and described a specific construction as illustrative of a preferred embodiment of my invention, I do not desire to limit myself to the details, forms of construction or arrangement, as various changes may be made without departing from the invention as set forth in the appended claim.

What I claim is:

A horn bracket comprising an elongated strip of sheet metal, a comparatively short strip of sheet metal adjustable longitudinally with respect to the elongated strip, means for securing said strips in various positions of adjustment, the comparatively short strip being formed at its inner end with a horn-attaching flange positioned at an intermediate point along the other strip extending at substantially right angles to the strip and having an arcuate edge portion and bolt openings adjacent said edge, and one of said strips being formed in a channel adapted to receive the other, and a bolt receiving flange carried by each strip, each bolt-receiving flange extending at substantially right angles to its respective strip.

In witness whereof I have hereunto set my hand this 30th day of August, 1922.

WILLIAM SPARKS.

Witnesses:
LILLIAN WUNDERLICH,
WM. JOHNSTON.